United States Patent
Hilton et al.

(10) Patent No.: US 11,110,671 B2
(45) Date of Patent: Sep. 7, 2021

(54) LAYUP SUPPORT CONFIGURED TO PROVIDE SUPPORT FOR LAYING UP COMPOSITE MATERIAL

(71) Applicant: The Boeing Company, Chicago, IL (US)

(72) Inventors: Corydon D. Hilton, North Charleston, SC (US); Bryan R. McLaughlin, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 16/294,480

(22) Filed: Mar. 6, 2019

(65) Prior Publication Data

US 2020/0282676 A1 Sep. 10, 2020

(51) Int. Cl.
*B32B 37/00* (2006.01)
*B29C 70/54* (2006.01)
*B29C 70/34* (2006.01)

(52) U.S. Cl.
CPC .......... *B29C 70/543* (2013.01); *B29C 70/342* (2013.01)

(58) Field of Classification Search
CPC .......................... B29C 70/543; B29C 70/342
USPC .......................................................... 156/242
See application file for complete search history.

(56) References Cited

U.S. PATENT DOCUMENTS

| 7,527,222 | B2 | 5/2009 | Biornstad et al. | |
| 8,043,554 | B2* | 10/2011 | Yip | B29C 70/342 |
| | | | | 264/573 |
| 8,157,212 | B2 | 4/2012 | Biornstad et al. | |
| 8,182,628 | B2 | 5/2012 | Biornstad et al. | |
| 8,382,037 | B2 | 2/2013 | Biornstad et al. | |
| 8,906,179 | B2* | 12/2014 | Coxon | B29C 70/32 |
| | | | | 156/194 |
| 9,238,335 | B2 | 1/2016 | Robins et al. | |
| 9,327,467 | B2 | 5/2016 | Robins et al. | |
| 9,827,720 | B2 | 11/2017 | Heath et al. | |
| 10,059,041 | B2 | 8/2018 | Heath et al. | |

* cited by examiner

*Primary Examiner* — James D Sells
(74) *Attorney, Agent, or Firm* — Yee & Associates, P.C.

(57) ABSTRACT

An illustrative embodiment of the present disclosure provides a method of forming a composite structure. Composite material is placed into a cavity of a mold. A layup support is placed over the cavity. A number of composite plies is laid up over the layup support, the composite material, and the cavity.

20 Claims, 12 Drawing Sheets

LAYUP SUPPORT CONFIGURED TO PROVIDE SUPPORT FOR LAYING UP COMPOSITE MATERIAL

BACKGROUND INFORMATION

1. Field

The present disclosure relates generally to forming composite structures, and more specifically to laying up composite material. Yet more specifically, a layup support is provided to support the layup of composite material over a cavity in a mold.

2. Background

In manufacturing composite structures, layers of composite material are typically laid up on a tool or mold. The layers may be comprised of fibers in sheets. These sheets may take the form of fabrics, tape, tows, or other suitable forms. In some cases, resin may be infused or pre-impregnated into the sheets. These types of sheets are commonly referred to as prepreg.

These layers may be laid up by hand or using automated lamination equipment such as a tape laminating machine or a fiber placement system. Tools and molds for laying up composite material have any desirable size, shape, curvature, and cavities. The layup of composite material layers by automated lamination equipment over some shapes of tools may result in undesirable inconsistencies.

Therefore, it would be desirable to have a method and apparatus that takes into account at least some of the issues discussed above, as well as other possible issues. For example, it would be desirable to present a method and apparatus for reducing inconsistencies in layup of composite material.

SUMMARY

An illustrative embodiment of the present disclosure provides a method of forming a composite structure. Composite material is placed into a cavity of a mold. A layup support is placed over the cavity. A number of composite plies is laid up over the layup support, the composite material, and the cavity.

Another illustrative embodiment of the present disclosure provides a layup support configured to provide support for laying up composite material. The layup support comprises a first surface having a curvature configured to continue a curvature of a mold over a cavity in the mold, and a second surface opposite the first surface. The second surface faces the cavity.

A further illustrative embodiment of the present disclosure provides a composite layup system. The composite layup system comprises a mold having a curvature and a cavity, and a layup support configured to provide support for laying up composite material on the mold. The layup support comprises a first surface having a curvature configured to continue the curvature of the mold over the cavity and a second surface opposite the first surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
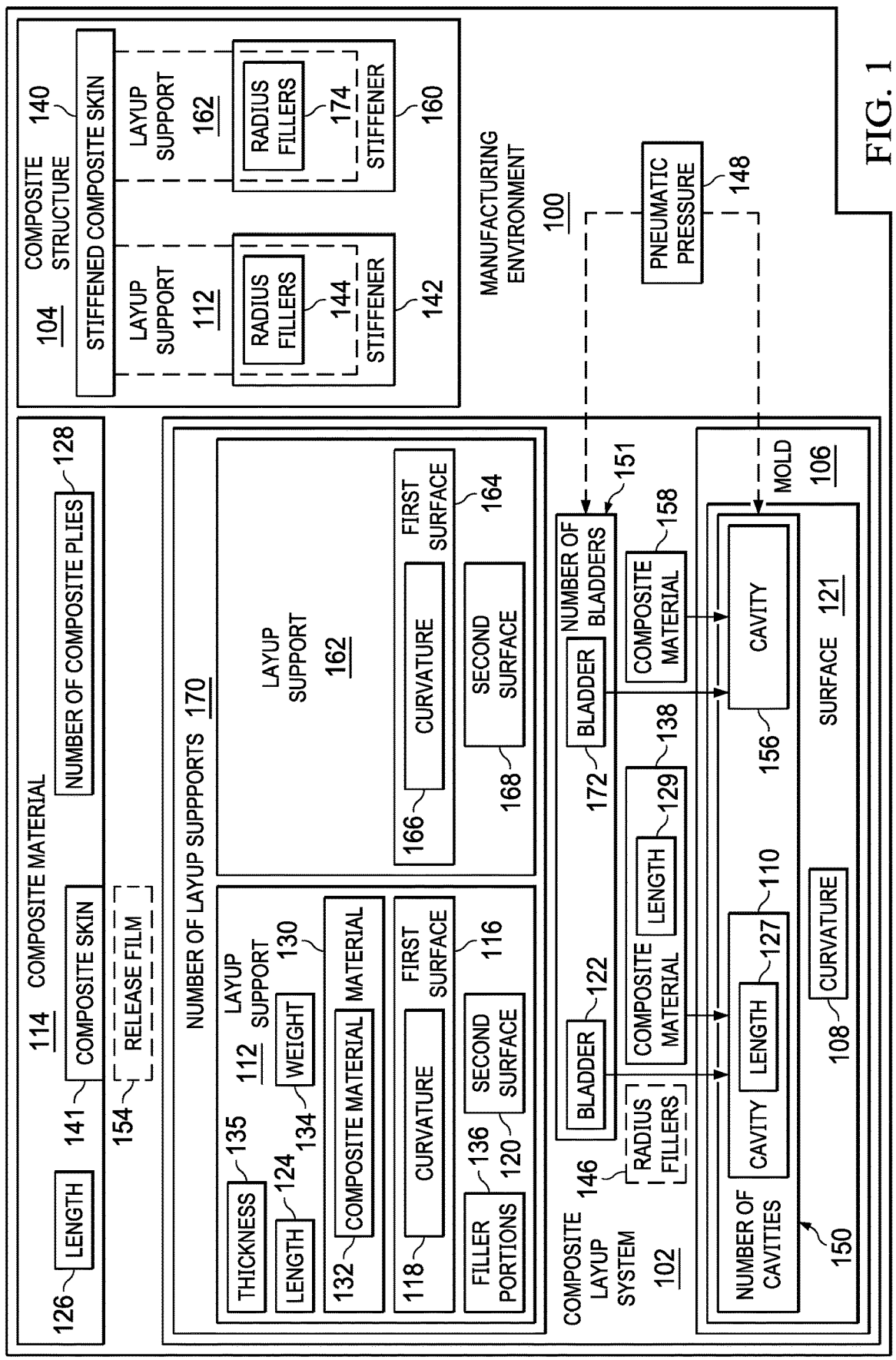
FIG. 1 is an illustration of a block diagram of a manufacturing environment in which a layup support is utilized in accordance with an illustrative embodiment.

The illustrative embodiments recognize and take into account one or more different considerations. For example, the illustrative embodiments recognize and take into account that in some cases, automated lamination equipment in combination with a shape of a tool may result in inconsistencies. For example, automated lamination equipment in combination with a shape of a tool may result in 'lifted' tows. 'Lifted' tows are tows that did not stick to a previous ply during laydown. The illustrative embodiments recognize and take into account that inconsistencies may occur near the edges of cavities in a mold. The illustrative embodiments recognize and take into account that a bladder within a cavity in a mold may not prevent inconsistencies near the edges of the cavity.

The illustrative embodiments recognize and take into account that inner mold line (IML) tooling with integral stiffeners use bladders or mandrels to fill a stiffener cavity. The illustrative embodiments recognize and take into account that during lamination of the outer composite skin over the stiffener bladders, inconsistencies in the composite skin can occur when the fiber placement roller applies pressure to the soft bladder or mandrel.

The automated lamination equipment includes at least one compaction roller to apply pressure to lay down the composite material. As the automated lamination equipment applies composite material over a bladder, the compaction force supplied by the at least one compaction roller may not be applied evenly across all of the composite material. As the automated lamination equipment applies composite material over a bladder, the compaction force supplied by the at least one compaction roller may not be applied evenly across all of the bladder.

The illustrative embodiments recognize and take into account that inconsistencies increase manufacturing time of a composite structure. The illustrative embodiments recognize and take into account that inspection and correction of inconsistencies may be performed manually. The illustrative embodiments recognize and take into account that decreasing inconsistencies may decrease operator time. The illustrative embodiments recognize and take into account that 'lifted' tows may increase time spent by operators reviewing and manually tacking the tows to the below layer.

The illustrative examples present a layup support configured to provide support for laying up composite material. Using a layup support reduces inconsistencies during composite layup. The layup support comprises a first surface having a curvature configured to continue a curvature of a mold over a cavity in the mold, and a second surface opposite the first surface. The second surface faces the cavity. The layup support is more rigid than a conventional bladder.

By reducing instances of inconsistencies manufacturing time is reduced. By reducing inconsistencies, operator time may be reduced. By reducing inconsistencies, resulting quality of the composite structure may be improved.

Turning now to FIG. 1, an illustration of a block diagram of a manufacturing environment of a manufacturing environment in which a layup support is utilized is depicted in accordance with an illustrative embodiment. Manufacturing environment 100 includes composite layup system 102 configured to form composite structure 104. Composite structure 104 is a structure formed of a cured composite material. Composite structure 104 is formed by laying up and curing composite material.

Composite layup system 102 comprises mold 106 having curvature 108 and cavity 110 and layup support 112 configured to provide support for laying up composite material 114 on mold 106. Layup support 112 comprises first surface 116 having curvature 118 configured to continue curvature 108 of mold 106 over cavity 110 and second surface 120 opposite first surface 116.

Curvature 108 of surface 121 of mold 106 has any desirable shape. In some illustrative examples, curvature 108 of mold 106 is convex. In these illustrative examples, curvature 118 of layup support 112 is also convex. In some illustrative examples, curvature 108 of mold 106 is substantially planar. In these illustrative examples, curvature 118 of layup support 112 is also substantially planar.

In some illustrative examples, composite layup system 102 includes bladder 122 configured to be placed within cavity 110. In these illustrative examples, layup support 112 is more rigid than bladder 122. In these illustrative examples, second surface 120 is configured to mirror bladder 122. In these illustrative examples, second surface 120 is in contact with bladder 122 or a number of films in contact with bladder 122. As used herein, a "number of" items is one or more items. For example, a "number of films" is one or more films.

Layup support 112 has length 124. Length 124 of layup support 112 is sufficient to support length 126 of composite material 114. In some illustrative examples, length 124 is greater than length 126 of composite material 114. In some illustrative examples, length 124 is less than length 126 of composite material 114.

In some illustrative examples, length 124 of layup support 112 is substantially the same as length 127 of cavity 110. In some illustrative examples, length 124 is substantially the same as length 129 of composite material 138.

Layup support 112 is configured to provide support for layup of number of composite plies 128 over mold 106. Layup support 112 is formed of material 130. Material 130 is selected to provide sufficient rigidity for layup of number of composite plies 128 over cavity 110 of mold 106. Material 130 is any desirable material that does not undesirably affect composite material 132 or composite material 114. In some illustrative examples, layup support 112 is configured to become part of composite structure 104. In some other illustrative examples, layup support 112 is configured to be removed from composite structure 104.

When layup support 112 becomes part of composite structure 104, material 130 is selected to provide desirable characteristics for composite structure 104. In some illustrative examples, when layup support 112 is a part of composite structure 104, layup support 112 is formed of composite material 132. Composite material 132 of layup support 112 is at least partially cured.

In some illustrative examples, when layup support 112 is part of composite structure 104, material 130 is selected to not add an undesirable amount of weight to composite structure 104. In some illustrative examples, when layup support 112 is part of composite structure 104, material 130 is selected to have a desirably low value for weight 134 of layup support 112.

In some illustrative examples, weight 134 of layup support 112 is controlled by controlling thickness 135 of layup support 112. In some illustrative examples, layup support 112 is formed of composite material 132, and thickness 135 of layup support 112 is formed by two to four composite plies.

In some illustrative examples, layup support 112 includes filler portions 136. When layup support 112 includes filler portions 136, filler portions 136 act as radius fillers between composite material 138 and composite material 114. Filler portions 136 have any desirable shape to fill a radius formed by composite material 138 and composite material 114.

To form composite structure 104, composite material 138 is placed into cavity 110 of mold 106. Layup support 112 is placed over cavity 110. Number of composite plies 128 is laid up over layup support 112, composite material 138, and cavity 110. Number of composite plies 128 and composite material 138 are cured while layup support 112 is present over cavity 110.

In some illustrative examples, curing number of composite plies 128 and composite material 138 forms stiffened composite skin 140 with layup support 112 bonded to number of composite plies 128. In some of these illustrative examples, curing number of composite plies 128 and composite material 138 forms stiffened composite skin 140 with layup support 112 co-bonded to number of composite plies 128. In these illustrative examples, composite material 114 takes the form of composite skin 141. In one illustrative example, when layup support 112 remains in composite structure 104, layup support 112 may be co-bonded to stiffened composite skin 140 and stiffener 142. In some illustrative examples, radius fillers 144 are formed by layup support 112.

In some illustrative examples, curing number of composite plies 128 and composite material 138 forms stiffened composite skin 140 with layup support 112 bonded to number of composite plies 128 by a layer of adhesive between layup support 112 and number of composite plies 128. In these illustrative examples, layup support 112 is formed of any desirable type of material 130 configured to exhibit desirable operating properties for resulting composite structure, composite structure 104. In one illustrative example, when layup support 112 remains in composite structure 104, layup support 112 may be bonded to stiffened composite skin 140 and stiffener 142 by adhesive. In some illustrative examples, radius fillers 144 are formed by layup support 112.

In other illustrative examples, curing number of composite plies 128 and composite material 138 forms stiffened composite skin 140 and layup support 112 is removed from stiffened composite skin 140 after curing composite material 138. In these illustrative examples, stiffener 142 is formed by composite material 138. In these illustrative examples, radius fillers 144 are formed by curing radius fillers 146, otherwise known as noodles, that are laid up between composite material 138 and composite material 114.

During curing, pneumatic pressure 148 is applied within each of number of cavities 150 of mold 106 to maintain the shape of composite material within number of cavities 150 during curing. In some illustrative examples, number of bladders 151 is placed into number of cavities 150 prior to curing. In these illustrative examples, pneumatic pressure 148 is applied to number of bladders 151.

In some illustrative examples, bladder 122 is placed into cavity 110 over composite material 138 and layup support 112 is placed over bladder 122. When pneumatic pressure 148 is applied to bladder 122, shape of composite material 138 is maintained during layup of number of composite plies 128 and curing. In these illustrative examples, layup support 112 is in contact with either bladder 122 or a release layer or film on bladder 122.

After curing composite material 114 and composite material 138, bladder 122 is removed from composite structure 104. In some illustrative examples, layup support 112 is also removed after curing composite material 114 and composite material 138. In these illustrative examples, release film 154 is placed over layup support 112 prior to laying up number of composite plies 128 over layup support 112.

As depicted, layup support 112 comprises filler portions 136 associated with layup support 112. Filler portions 136 replace radius fillers 146 in forming composite structure 104. When layup support 112 remains in composite structure 104 and layup support 112 comprises filler portions 136, filler portions 136 forms radius fillers 144 of composite structure 104.

As depicted, mold 106 comprises number of cavities 150 including cavity 156. Composite material 158 is placed into cavity 156 to form stiffener 160 of composite structure 104. Layup support 162 is placed over cavity 156 to support the layup of number of composite plies 128 over mold 106 including cavity 156. Layup support 162 is configured to continue curvature 108 of mold 106 over cavity 156.

Layup support 162 is configured to provide support for laying up composite material 114. Layup support 162 comprises first surface 164 having curvature 166 configured to continue curvature 108 of mold 106 over cavity 156 in mold 106. Layup support 162 also comprises second surface 168 opposite first surface 164. Second surface 168 faces cavity 156.

Although layup support 112 and layup support 162 are both used to support the layup of composite material 114 on mold 106, layup support 112 and layup support 162 may have different characteristics. For example, curvature 118 and curvature 166 may be different from each other. As another example, layup support 112 and layup support 162 may have different lengths. In some illustrative examples, layup support 112 and layup support 162 are formed of different materials. In some illustrative examples, only one of layup support 112 or layup support 162 has filler portions. In some illustrative examples, one of layup support 112 and layup support 162 is removed after forming composite structure 104 while the other of layup support 112 and layup support 162 forms a component of composite structure 104.

In some illustrative examples, layup support 112 is tailored to specifically fit cavity 110. In other illustrative examples, each of number of layup supports 170, including layup support 112 and layup support 162, is interchangeable.

In some illustrative examples, bladder 172 is placed into cavity 156 prior to placing layup support 162 over cavity 156. In some illustrative examples, bladder 172 is optional.

In some illustrative examples, layup support 162 remains in composite structure 104. In some illustrative examples in which layup support 162 remains in composite structure 104, filler portions (not depicted) of layup support 162 form radius filler 174.

The illustration of manufacturing environment 100 and composite layup system 102 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, as depicted number of cavities 150 include two cavities: cavity 110 and cavity 156. Number of cavities 150 is only illustrative and may contain any quantity of cavities. As another illustrative example, filler portions 136 may be optional.

Figure 2:
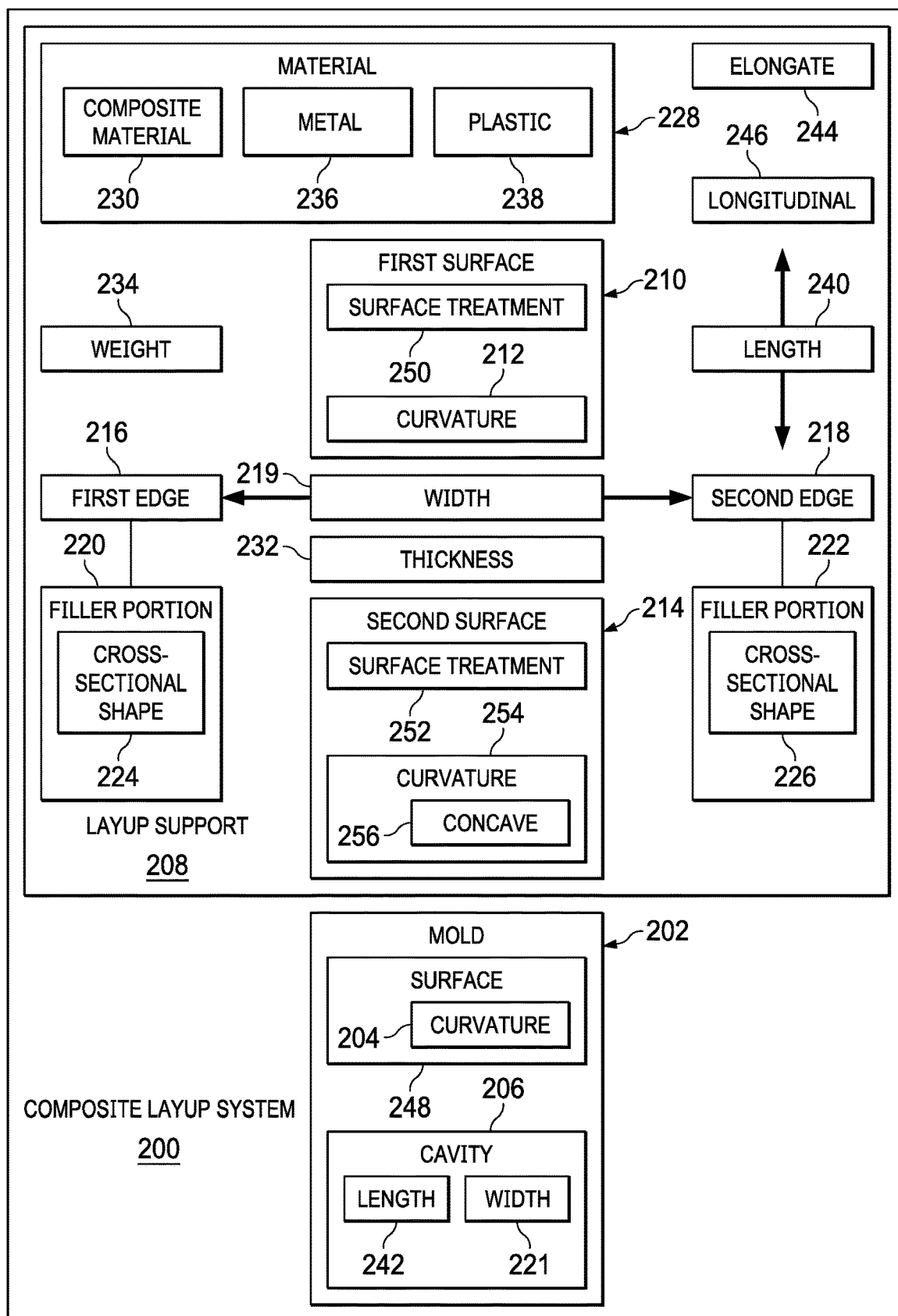
FIG. 2 is an illustration of a block diagram of a layup support in accordance with an illustrative embodiment.

Turning now to FIG. 2, an illustration of a block diagram of a layup support is depicted in accordance with an illustrative embodiment. Composite layup system 200 is an example of composite layup system 102 of FIG. 1. Composite layup system 200 comprises mold 202 having curvature 204 and cavity 206 and layup support 208 configured to provide support for laying up composite material on mold 202. Mold 202 is an example of mold 106 of FIG. 1. Layup support 208 is an example of layup support 112 of FIG. 2.

Layup support 208 comprises first surface 210 having curvature 212 configured to continue curvature 204 of mold 202 over cavity 206 and second surface 214 opposite first surface 210. Second surface 214 faces cavity 206. Layup support 208 further comprises first edge 216 and second edge 218 separated by width 219 of layup support 208. Width 219 of layup support 208 is substantially the same as width 221 of cavity 206.

In some illustrative examples, layup support 208 has a number of filler portions associated with first edge 216 and second edge 218. In these illustrative examples, layup support 208 forms a part of the final composite structure formed. In these illustrative examples, the number of filler portions replace radius fillers in a stiffener of a composite structure.

As depicted, filler portion 220 is associated with first edge 216. As depicted, filler portion 222 is associated with second edge 218. As depicted, the number of filler portions comprises a first filler portion, filler portion 220, having cross-sectional shape 224 configured to form a radius filler between a composite stiffener and a composite skin and a second filler portion, filler portion 222, having cross-sectional shape 226 configured to form a second radius filler between the composite stiffener and the composite skin.

Layup support 208 is formed of material 228 selected to provide sufficient support to a composite material during layup. Material 228 is selected to have sufficient rigidity to provide support to the composite material during layup. Material 228 is selected to be stable at a curing temperature of the composite material supported by layup support 208. In some illustrative examples, material 228 is selected to be removeable and reusable. In some illustrative examples, material 228 is selected to remain a part of the formed composite structure.

When material 228 is selected to remain a part of the formed composite structure, material 228 is composite material 230. When material 228 is composite material 230, layup support 208 is formed of at least partially cured composite material 230. Composite material 230 is at least partially cured to provide sufficient rigidity to support the layup of a number of composite plies. By composite material 230 being at least partially cured, cross-sectional shape 224 and cross-sectional shape 226 are maintained.

When material 228 is composite material 230, thickness 232 of layup support 208 is controlled so as to not add an undesirable amount of weight to a resulting composite structure. In some illustrative examples, when material 228 is composite material 230, thickness 232 of layup support 208 is formed by two to four composite plies. When layup support 208 remains in the cured composite structure, weight 234 is controlled so as to not add an undesirable amount of weight to a resulting composite structure. In some illustrative example, weight 234 is controlled by layup support 208 being formed of two to four composite plies. Type of composite material 230 also contributes to weight 234. In some illustrative examples, composite material 230 is selected to not add an undesirable amount of weight to a resulting composite structure.

In some illustrative examples, material 228 is metal 236. When material 228 is metal 236, layup support 208 may be removed and reused for future composite layups.

In some illustrative examples, material 228 is plastic 238. Plastic 238 is selected to withstand curing temperatures of the composite structure. Plastic 238 is selected to not undesirably interact with the composite material.

Layup support 208 is configured to support composite material laid up over cavity 206 of mold 202. In some illustrative examples, length 240 of layup support 208 is substantially the same as length 242 of cavity 206. In some illustrative examples, length 242 is substantially greater than width 221. In these illustrative examples, layup support 208 is referred to as elongate 244 or longitudinal 246.

First surface 210 has curvature 212 configured to continue curvature 204 of mold 202. Curvature 212 has any desirable shape. In some illustrative examples, curvature 212 is a complex curvature. When curvature 204 is convex, curvature 212 is also convex. When curvature 204 is substantially planar, curvature 212 is also planar. First surface 210 of layup support 208 may be referred to as a continuation of surface mold 202.

Composite material will be laid up over first surface 210. In some illustrative examples, first surface 210 has surface treatment 250 to release layup support 208 from a resulting cured composite structure. Surface treatment 250 may take any desirable form such as a mechanical surface treatment, chemical surface treatment, release film, or any other desirable surface treatment. In some illustrative examples, second surface 214 has surface treatment 252 to release layup support 208 from a resulting cured composite structure. In some illustrative examples, surface treatment 252 and surface treatment 250 are the same.

When surface treatment 250 and surface treatment 252 are present to release layup support 208, filler portion 220 and filler portion 222 are not present. Filler portion 220 and filler portion 222 are optionally present when layup support 208 is configured to remain in the resulting composite structure.

When layup support 208 is positioned in cavity 206, second surface 214 faces cavity 206. Second surface 214 has curvature 254. When a bladder is used in cavity 206 in composite layup system 200, curvature 254 mirrors a top surface of the bladder. In some illustrative examples, curvature 254 is concave 256.

Figure 3:
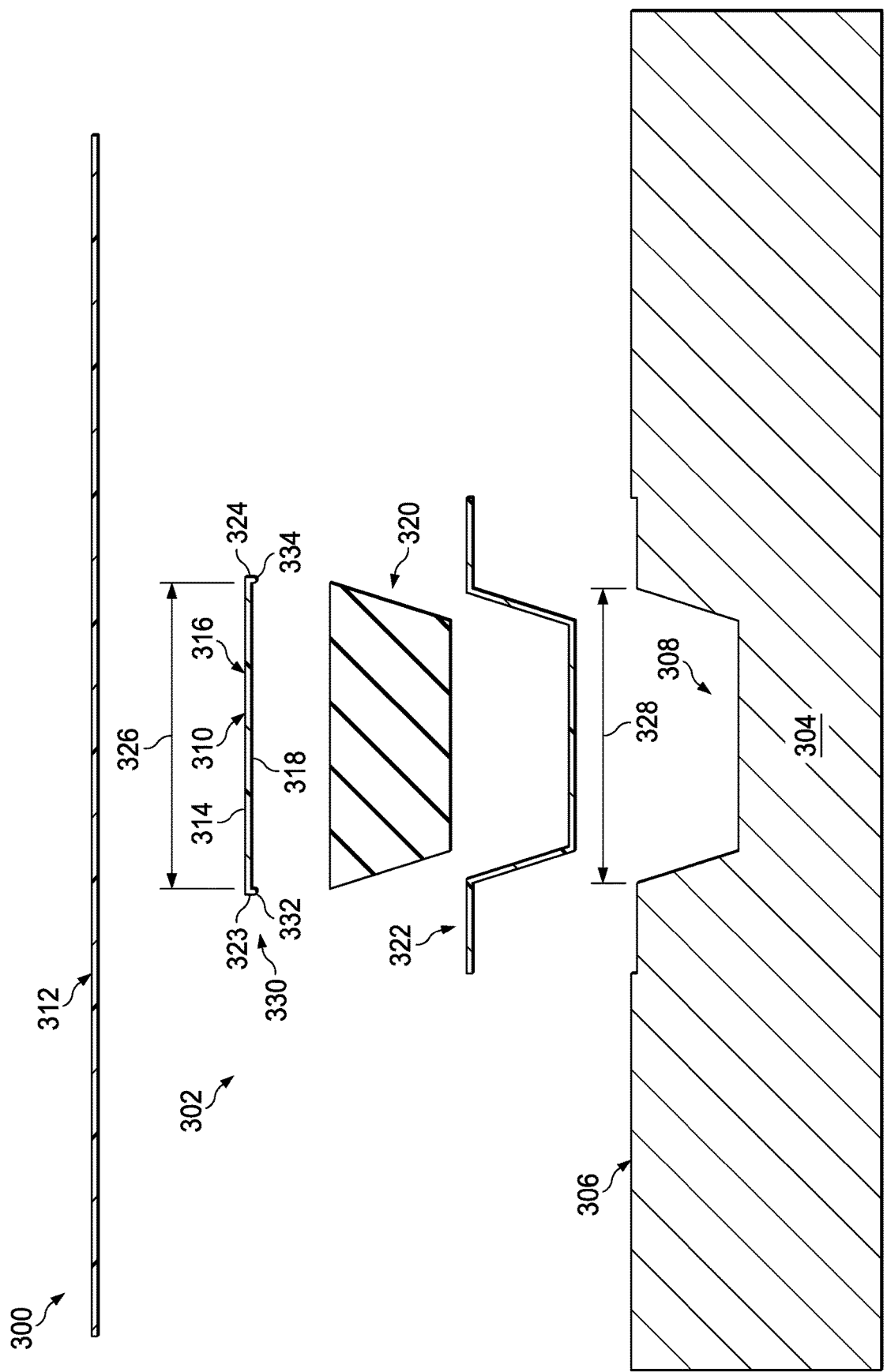
FIG. 3 is an illustration of an exploded view of a manufacturing environment with a layup support in accordance with an illustrative embodiment.

Turning now to FIG. 3, an illustration of an exploded view of a manufacturing environment with a layup support is depicted in accordance with an illustrative embodiment. Manufacturing environment 300 is a physical implementation of manufacturing environment 100 of FIG. 1. Composite layup system 302 is present in manufacturing environment 300. Composite layup system 302 is a physical implementation of composite layup system 102 of FIG. 1. Composite layup system 302 is a physical implementation of composite layup system 200 of FIG. 2.

Composite layup system 302 comprises mold 304 having curvature 306 and cavity 308, and layup support 310 configured to provide support for laying up composite material 312 on the mold 304. Composite material 312 comprises a number of composite plies. In some illustrative examples, composite material 312 is referred to as a composite skin. Layup support 310 comprises first surface 314 having curvature 316 configured to continue curvature 306 of mold 304 over cavity 308, and second surface 318 opposite first surface 314. Second surface 318 faces cavity 308.

In this illustrative example, composite layup system 302 further comprises bladder 320 configured to be placed within cavity 308. Bladder 320 is configured to maintain pressure between composite material 312 and composite material 322. Pressure applied to bladder 320 maintains shape of composite material 312 during curing of composite material 312.

As depicted, curvature 306 of mold 304 is substantially planar. Layup support 310 further comprises first edge 323 and second edge 324 separated by width 326 of layup support 310. Width 326 of layup support 310 is substantially the same as width 328 of cavity 308. As depicted, layup support 310 further comprises number of filler portions 330 associated with first edge 323 and the second edge 324. As depicted, filler portion 332 is associated with first edge 323. As depicted filler portion 334 is associated with second edge 324.

Filler portion 332 and filler portion 334 will form radius fillers of a formed composite structure. In some illustrative examples, layup support 310 is formed of an at least partially cured composite material. When layup support 310 is formed of a composite material, layup support 310 will be bonded to composite material 312 and composite material 322 during curing by at least one of co-bonding or separate layers of adhesive.

In some illustrative examples, a length of layup support 310 is substantially the same as a length of cavity 308. In manufacturing environment 300, the lengths of layup support 310 and cavity 308 extend into and out of the page.

Figure 4:
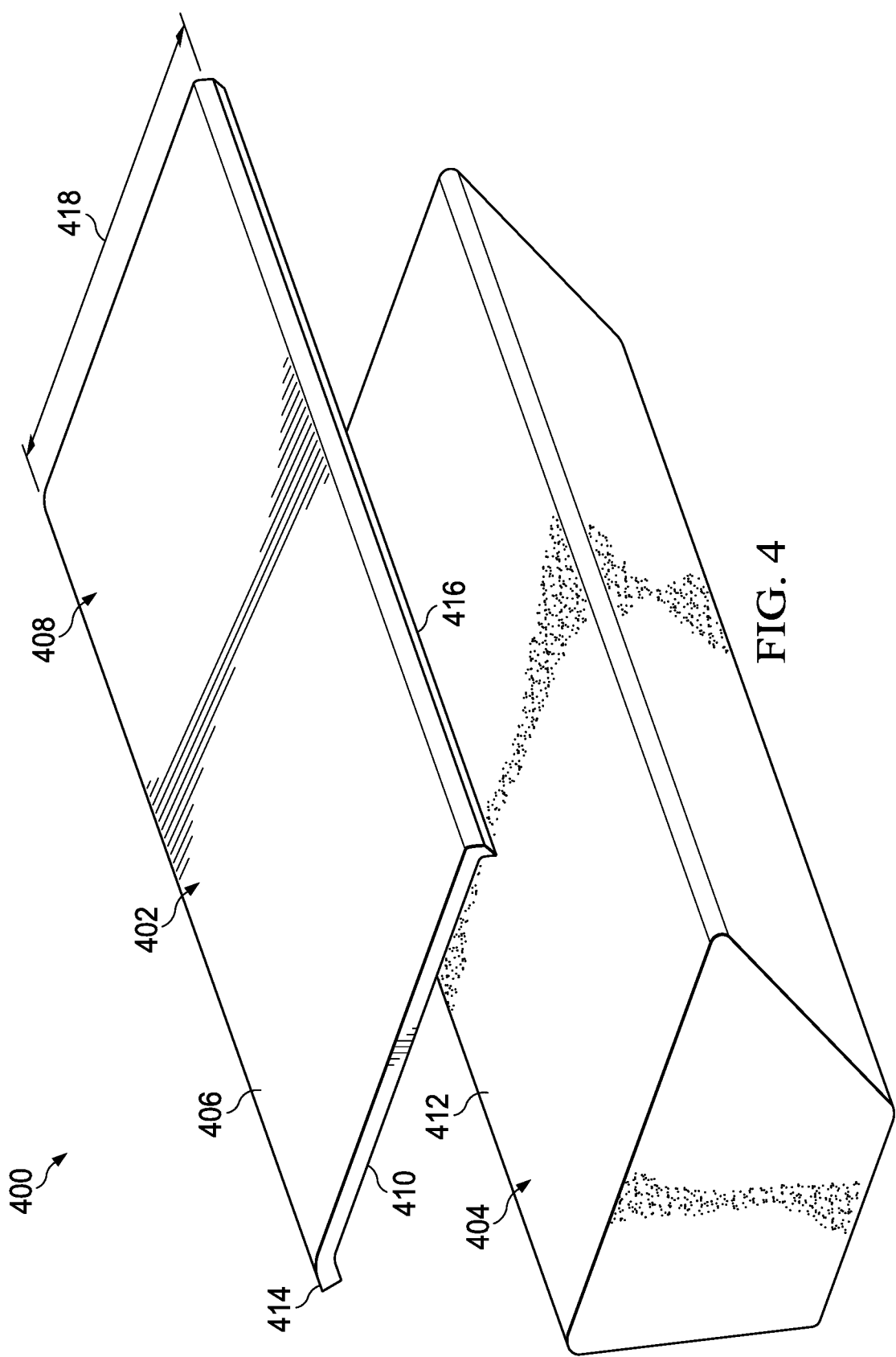
FIG. 4 is an illustration of an exploded view of a layup support and a bladder in accordance with an illustrative embodiment.

Turning now to FIG. 4, an illustration of an exploded view of a layup support and a bladder is depicted in accordance with an illustrative embodiment. In view 400, layup support 402 and bladder 404 are present. Layup support 402 is a physical implementation of layup support 112 of FIG. 1. Layup support 402 is a physical implementation of layup support 208 of FIG. 2. Bladder 404 is a physical implementation of bladder 122 of FIG. 1. Bladder 404 and layup support 402 are components of a composite layup system. In some illustrative examples, layup support 402 is the same as layup support 310 of FIG. 3. In some illustrative examples, bladder 404 is the same as bladder 320.

Layup support 402 is configured to provide support for laying up composite material. Layup support 402 comprises first surface 406 having curvature 408 configured to continue a curvature of a mold over a cavity in the mold and second surface 410 opposite first surface 406. Second surface 410 faces the cavity.

As depicted, second surface 410 faces bladder 404. In this illustrative example, second surface 410 faces surface 412 of bladder 404. In this illustrative example, second surface 410 complements surface 412 of bladder 404. In some illustrative examples, second surface 410 directly contacts surface 412 of bladder 404. In some other illustrative examples, second surface 410 contacts a film surrounding bladder 404. Layup support 402 has first edge 414 and second edge 416 separated from the first edge by width 418 of layup support 402.

Figure 5:
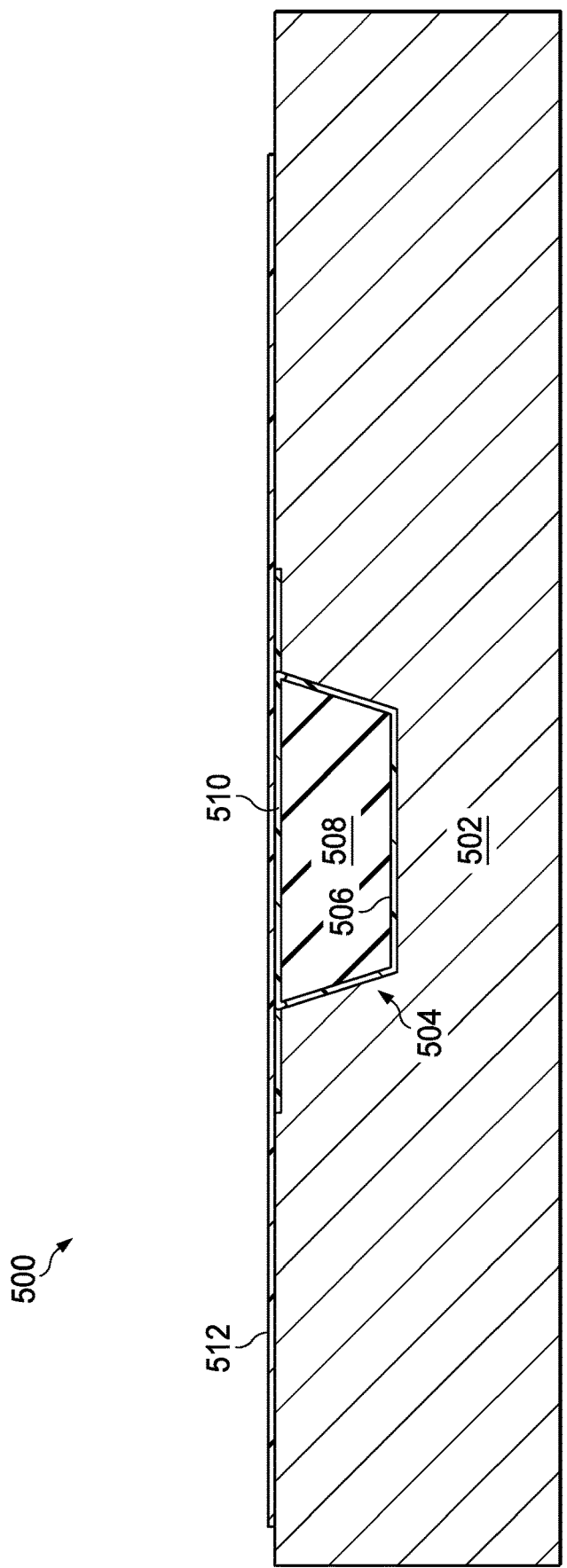
FIG. 5 is an illustration of a cross-sectional view of a mold with a cavity and a layup support in accordance with an illustrative embodiment.

Turning now to FIG. 5, an illustration of a cross-sectional view of a mold with a cavity and a layup support is depicted in accordance with an illustrative embodiment. In some illustrative examples, view 500 is a physical implementation of components of composite layup system 102 of FIG. 1. In some illustrative examples, view 500 is a physical implementation of components of composite layup system 200 of FIG. 2. In some illustrative examples, view 500 is an assembled view of the components of FIG. 3.

In view 500, mold 502 has cavity 504. Composite material 506 is placed within cavity 504. Portions of composite material 506 extend outside of cavity 504. Composite material 506 has a generally hat-shaped cross-section. Bladder 508 is positioned in cavity 504 over composite material 506. Layup support 510 is positioned over cavity 504. As depicted, layup support 510 is positioned over bladder 508.

Number of composite plies 512 are placed over composite material 506, layup support 510 and mold 502. Number of composite plies 512 may also be referred to as composite material or a composite skin.

Figure 6:
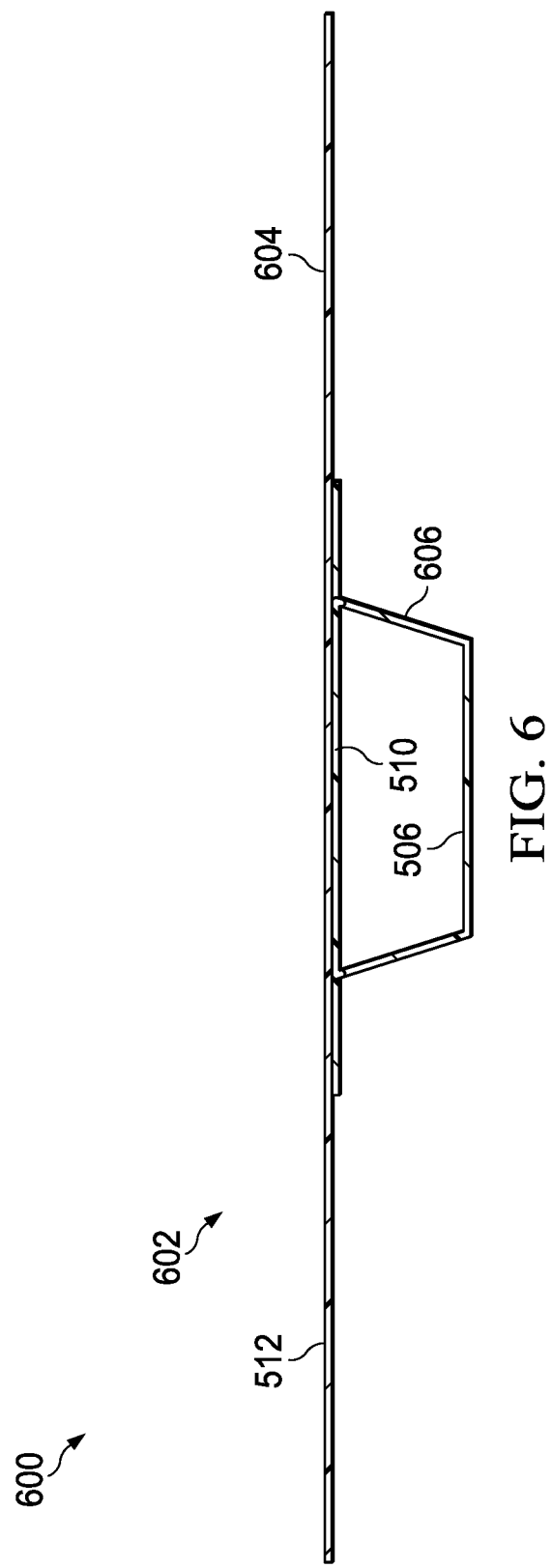
FIG. 6 is an illustration of a cross-sectional view of a composite structure with a layup support in accordance with an illustrative embodiment.

Turning now to FIG. 6, an illustration of a cross-sectional view of a composite structure with a layup support is depicted in accordance with an illustrative embodiment. View 600 is a cross-sectional view of composite structure 602. Composite structure 602 is a structure formed by co-curing composite material 506 and number of composite plies 512. Composite structure 602 has been removed from mold 502 and bladder 508 has been removed from between composite material 506 and layup support 510.

As depicted, layup support 510 forms part of composite structure 602. In this illustrative example, layup support 510 is formed of a composite material. In this illustrative example, layup support 510 is formed of a material configured to maintain desirable material and mechanical characteristics of composite structure 602 without adding an undesirable amount of weight.

Composite structure 602 comprises stiffened composite skin 604 and stiffener 606. Stiffener 606 extends into and out of the page.

Figure 7:
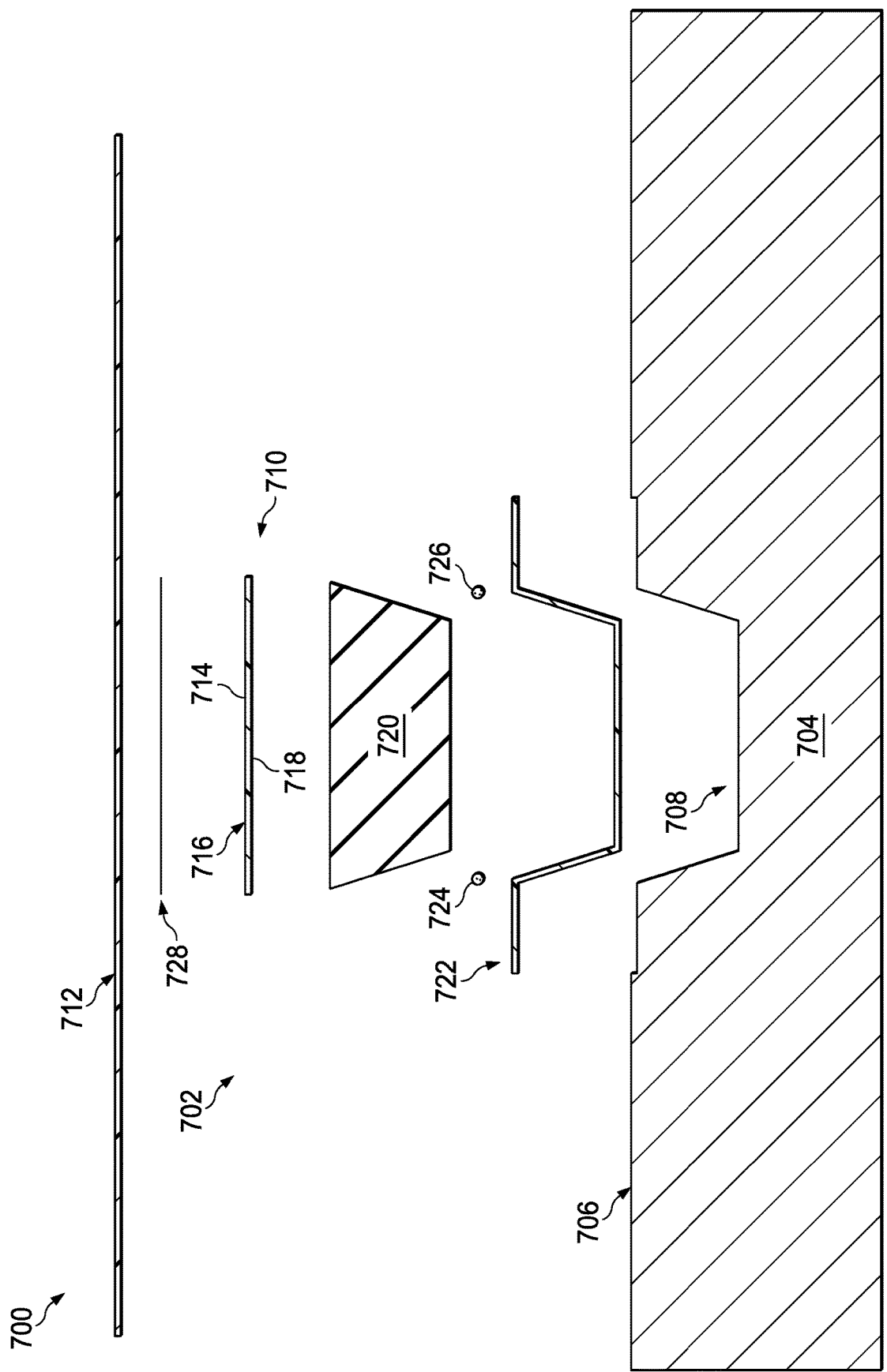
FIG. 7 is an illustration of an exploded view of a manufacturing environment with a layup support in accordance with an illustrative embodiment.

Turning now to FIG. 7, an illustration of an exploded view of a manufacturing environment with a layup support is depicted in accordance with an illustrative embodiment. Manufacturing environment 700 is a physical implementation of manufacturing environment 100 of FIG. 1. Composite layup system 702 is present in manufacturing environment 700. Composite layup system 702 is a physical implementation of composite layup system 102 of FIG. 1. Composite layup system 702 is a physical implementation of composite layup system 200 of FIG. 2.

Composite layup system 702 comprises mold 704 having curvature 706 and cavity 708, and layup support 710 configured to provide support for laying up composite material 712 on the mold 704. Composite material 712 comprises a number of composite plies. In some illustrative examples, composite material 712 is referred to as a composite skin. Layup support 710 comprises first surface 714 having curvature 716 configured to continue curvature 706 of mold 704 over cavity 708 and second surface 718 opposite first surface 714.

In this illustrative example, composite layup system 702 further comprises bladder 720 configured to be placed within cavity 708. Bladder 720 is configured to maintain pressure between composite material 712 and composite material 722. Pressure applied to bladder 720 maintains shape of composite material 712 during curing of composite material 712.

In this illustrative example, radius filler 724 and radius filler 726 are depicted. Radius filler 724 and radius filler 726 are configured to be placed at the intersections of composite material 712 and composite material 722.

As depicted, release film 728 is present between layup support 710 and composite material 712. Release film 728 enables removal of layup support 710 from the layup after curing composite material 712 and composite material 722.

Layup support 710 is formed of any desirable material. As layup support 710 is removed after curing composite material 712 and composite material 722, the material of layup support 710 is selected for layup and curing processes. As layup support 710 will be removed from a resulting composite structure, layup support 710 is not selected based on a desired weight or material performance of the resulting composite structure.

Figure 8:
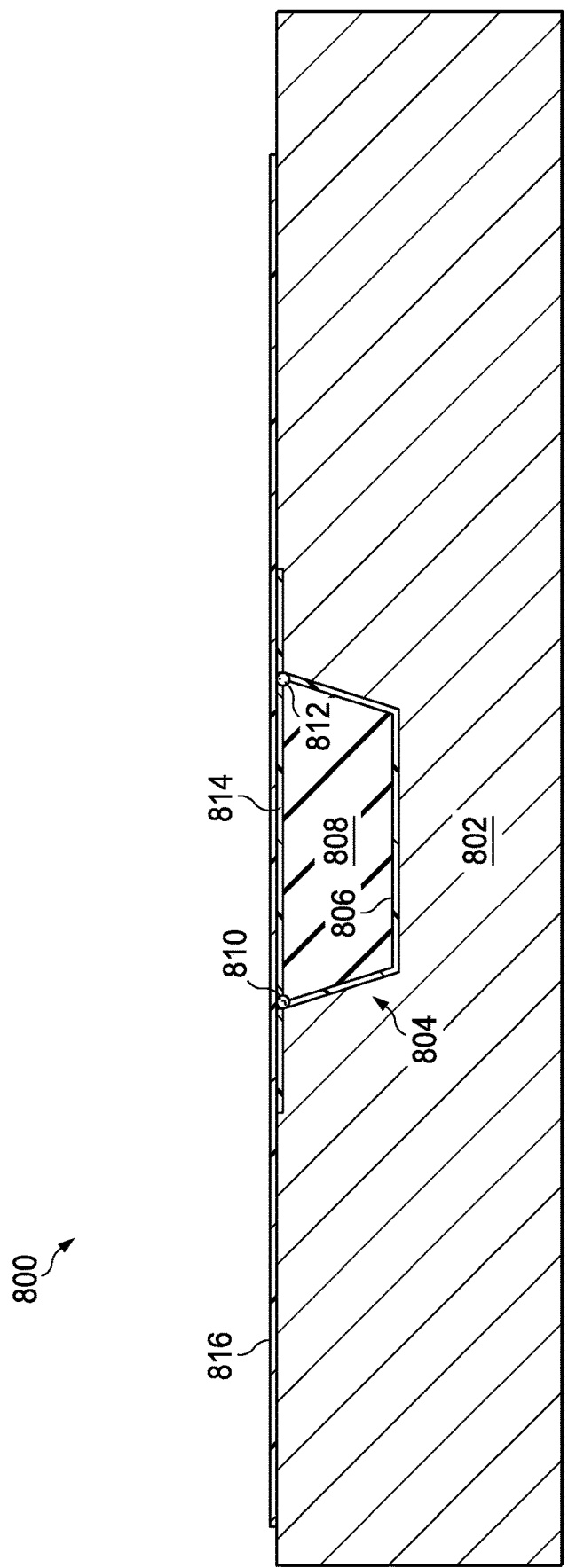
FIG. 8 is an illustration of a cross-sectional view of a mold with a cavity and a layup support in accordance with an illustrative embodiment.

Turning now to FIG. 8, an illustration of a cross-sectional view of a mold with a cavity and a layup support is depicted in accordance with an illustrative embodiment. In some illustrative examples, view 800 is a physical implementation of components of composite layup system 102 of FIG. 1. In some illustrative examples, view 800 is a physical implementation of components of composite layup system 200 of FIG. 2. In some illustrative examples, view 800 is an assembled view of the components of FIG. 7.

In view 800, mold 802 has cavity 804. Composite material 806 is placed within cavity 804. Portions of composite material 806 extend outside of cavity 804. Composite material 806 has a generally hat-shaped cross-section. Bladder 808 is positioned in cavity 804 over composite material 806.

Radius filler 810 and radius filler 812 are positioned in contact with composite material 806. Layup support 814 is positioned over cavity 804. As depicted, layup support 814 is positioned over bladder 808.

Number of composite plies 816 is placed over composite material 806, layup support 814 and mold 802. Number of composite plies 816 may also be referred to as composite material or a composite skin.

Layup support 814 provides support to laying up of number of composite plies 816. Layup support 814 is selected to provide sufficient rigidity to support the layup of number of composite plies 816. Layup support 814 is configured to prevent 'lifting' of number of composite plies 816 after layup.

In view 800, a release film is not visible between layup support 814 and number of composite plies 816. If layup support 814 is a composite material and a release film is not present, layup support 814 may remain as a part of a final cured composite structure.

In some illustrative examples, a surface treatment of layup support 814 allows for removal of layup support 814 from a final cured composite structure. Although not visible, the surface treatment of layup support 814 may take the form of a release film between layup support 814 and number of composite plies 816.

Figure 9:
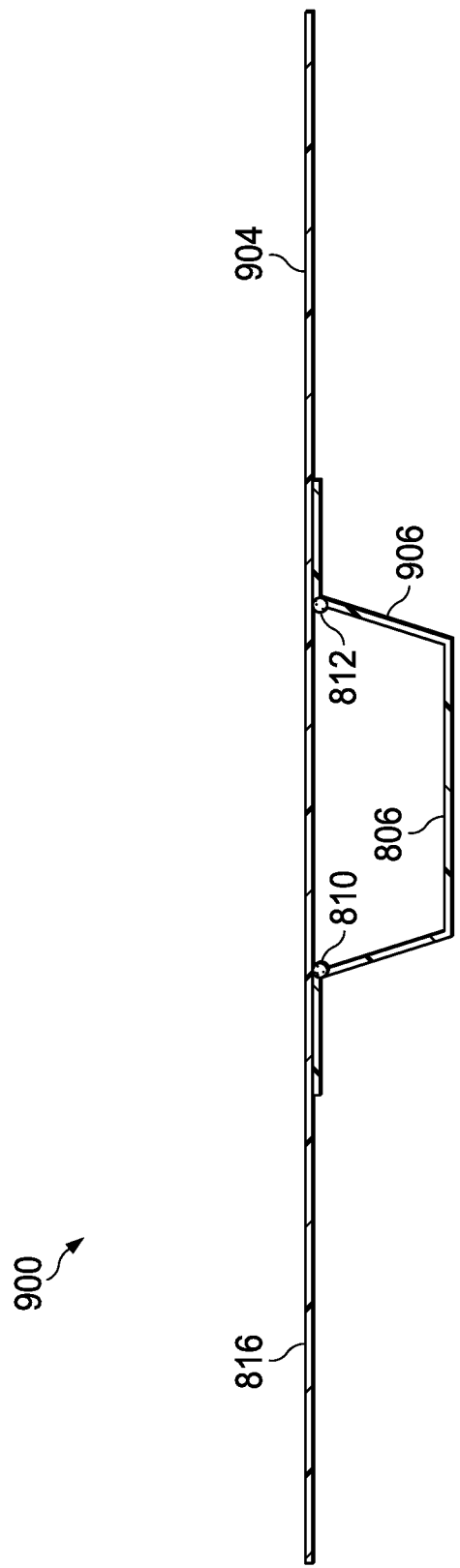
FIG. 9 is an illustration of a cross-sectional view of a composite structure formed using a layup support in accordance with an illustrative embodiment.

Turning now to FIG. 9, an illustration of a cross-sectional view of a composite structure formed using a layup support is depicted in accordance with an illustrative embodiment. View 900 is a cross-sectional view of composite structure 902. Composite structure 902 is stiffened composite skin 904 with stiffener 906. Composite structure 902 is a structure formed by co-curing composite material 806, radius filler 810, radius filler 812, and number of composite plies 816. In this illustrative example, layup support 814 of FIG. 8 was removed from composite structure 902 after curing.

As layup support 814 was removed from composite structure 902, layup support 814 is formed of any desirable material for forming of composite structure 902. The material of layup support 814 of FIG. 8 is not selected based on a desired weight or material performance of composite structure 902.

Figure 10:
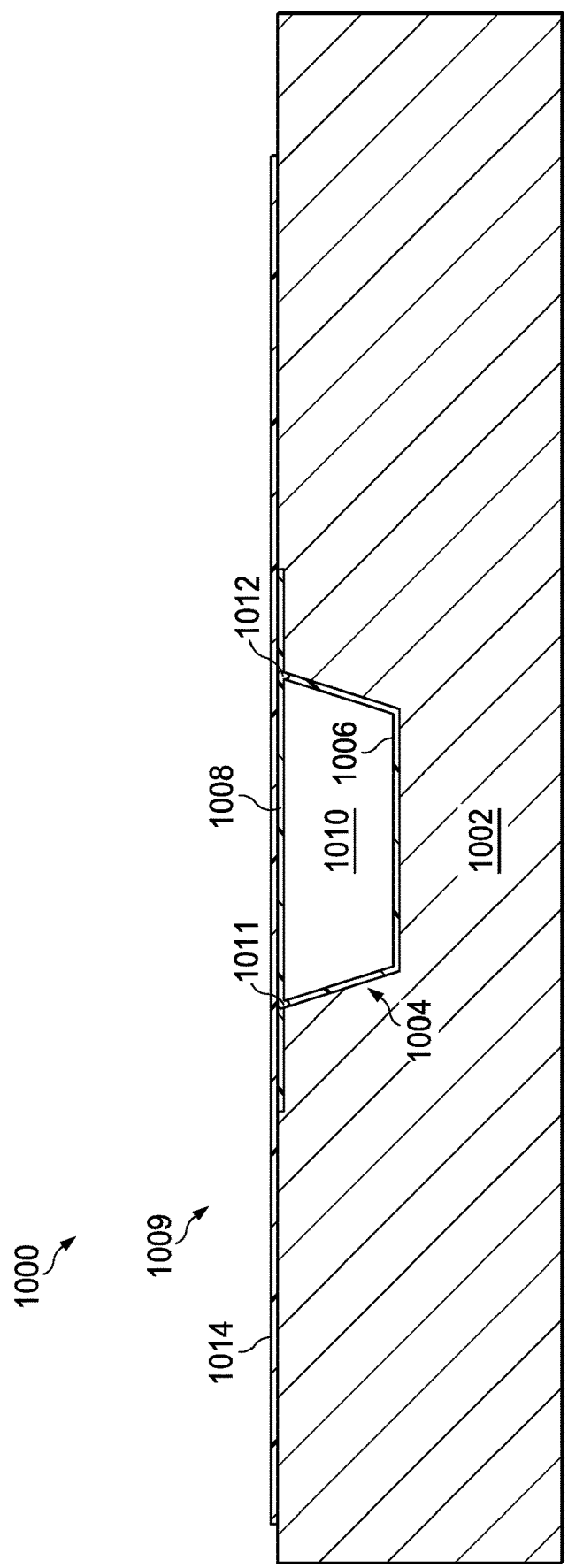
FIG. 10 is an illustration of a cross-sectional view of a mold with a cavity and a layup support in accordance with an illustrative embodiment.

Turning now to FIG. 10, an illustration of a cross-sectional view of a mold with a cavity and a layup support is depicted in accordance with an illustrative embodiment. In some illustrative examples, view 1000 is a physical implementation of components of composite layup system 102 of FIG. 1. In some illustrative examples, view 1000 is a physical implementation of components of composite layup system 200 of FIG. 2.

In view 1000, mold 1002 has cavity 1004. Composite material 1006 is placed within cavity 1004. Portions of composite material 1006 extend outside of cavity 1004. Composite material 1006 has a generally hat-shaped cross-section. Layup support 1008 is positioned over cavity 1004. As depicted, a bladder is not present in composite layup system 1009.

In composite layup system 1009, end caps positioned at either end of cavity 1004 seal composite material 1006 and layup support 1008. The end caps will be positioned at the longitudinal ends of cavity 1004. Pneumatic pressure is applied to region 1010 to maintain the shape of composite material 1006 during curing.

As depicted, layup support 1008 comprises filler portion 1011 and filler portion 1012. Filler portion 1011 and filler portion 1012 act as radius fillers at the intersections of composite material 1006 and number of composite plies 1014.

Number of composite plies 1014 are placed over composite material 1006, layup support 1008, and mold 1002. Number of composite plies 1014 may also be referred to as composite material or a composite skin. After layup of number of composite plies 1014, composite plies 1014 and composite material 1006 are cured to form a composite structure including layup support 1008.

Figure 11:
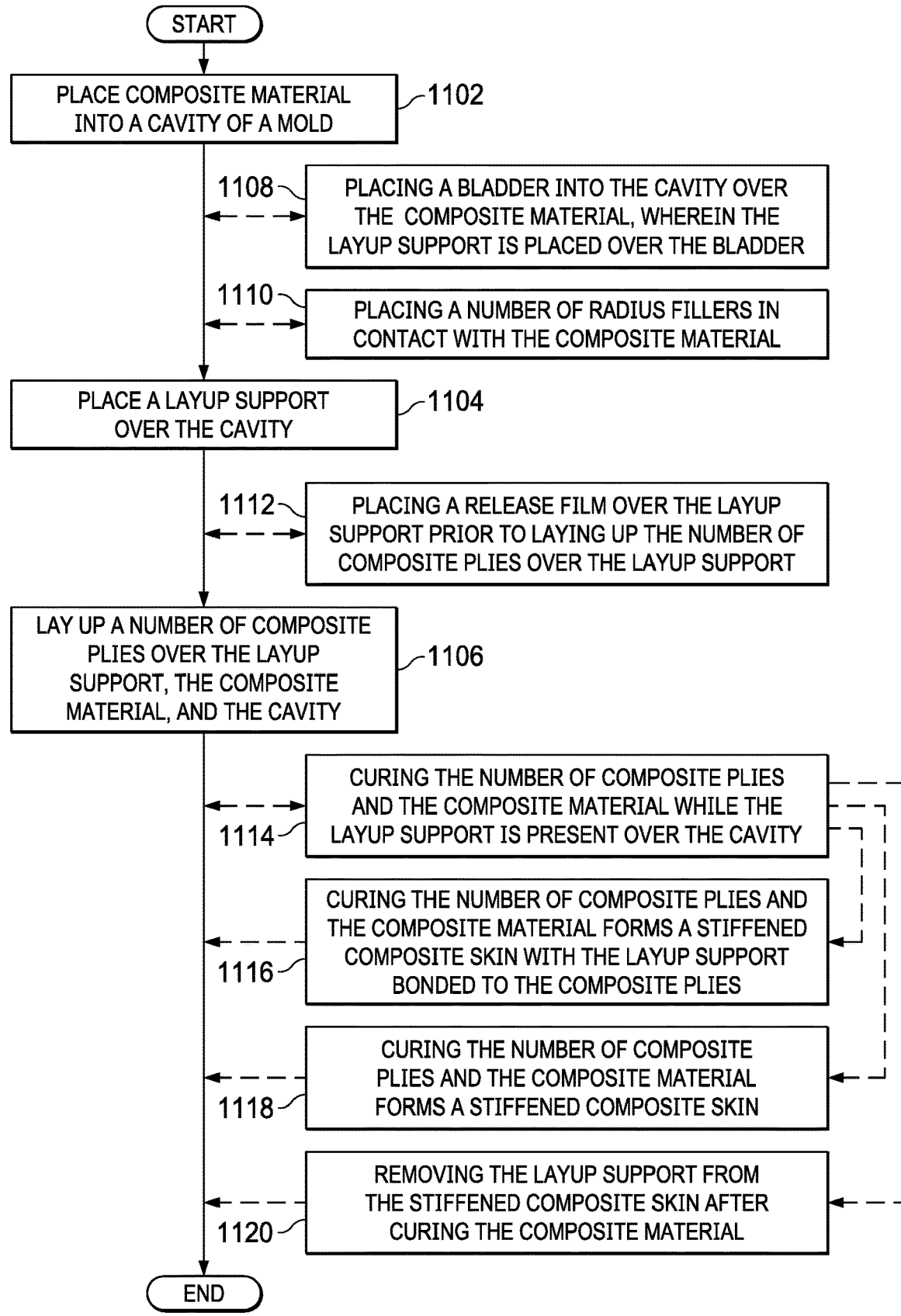
FIG. 11 is an illustration of a flowchart of a method of forming a composite structure in accordance with an illustrative embodiment.

Turning now to FIG. 11, an illustration of a flowchart of a method of forming a composite structure is depicted in accordance with an illustrative embodiment. Method 1100 is a method of forming composite structure 104 of FIG. 1 using layup support 112 and mold 106. Method 1100 is a method of forming a composite structure using layup support 208 and mold 202 of FIG. 2. Method 1100 is a method of forming a composite structure using layup support 310 and mold 304 of FIG. 3. Method 1100 is a method of forming a composite structure using layup support 402 of FIG. 4. Method 1100 is a method of forming a composite structure using layup support 510 and mold 502 of FIG. 5. Method 1100 is a method of forming composite structure 602 of FIG. 6. Method 1100 is a method of forming a composite structure using layup support 710 and mold 704 of FIG. 7. Method 1100 is a method of forming a composite structure using layup support 814 and mold 802 of FIG. 8. Method 1100 is a method of forming composite structure 902 of FIG. 9. Method 1100 is a method of forming a composite structure using layup support 1008 and mold 1002 of FIG. 10.

Method 1100 places composite material into a cavity of a mold (operation 1102). In some illustrative examples, portions of the composite material extend out of the cavity. In some illustrative examples, the composite material is placed into the cavity to form a hat shaped cross-section.

Method 1100 places a layup support over the cavity (operation 1104). The layup support is configured to support for laying up composite material. In some illustrative examples, the layup support is substantially the same width as the cavity. In some illustrative examples, the layup support continues a curvature of the mold over the cavity. In some illustrative examples, the layup support is more rigid than a conventional bladder.

Method 1100 lays up a number of composite plies over the layup support, the composite material, and the cavity (operation 1106). Afterwards, method 1100 terminates.

In some illustrative examples, method 1100 places a bladder into the cavity over the composite material, wherein the layup support is placed over the bladder (operation 1108). In some of these illustrative examples, the layup support contacts one of the bladder or a film covering the bladder.

In some illustrative examples, method 1100 places a number of radius fillers in contact with the composite material (operation 1110). In some illustrative examples, rather than a number of separate radius filler, the layup support has a number of filler portions.

In some illustrative examples, method 1100 places a release film over the layup support prior to laying up the number of composite plies over the layup support (operation 1112). When a release film is placed over the layup support, the layup support is removed after curing the number of composite plies.

In some illustrative examples, method 1100 cures the number of composite plies and the composite material while the layup support is present over the cavity (operation 1114). In some illustrative examples, curing the number of composite plies and the composite material forms a stiffened composite skin with the layup support bonded to the number of composite plies (operation 1116). The layup support may be bonded to the number of composite plies using at least one of co-bonding or additional adhesive.

In some illustrative examples, curing the number of composite plies and the composite material forms a stiffened composite skin (operation 1118). In some illustrative examples, method 1100 removes the layup support from the stiffened composite skin after curing the composite material (operation 1120).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, in method 1100, operations 1108 through 1120 may be optional.

Figure 12:
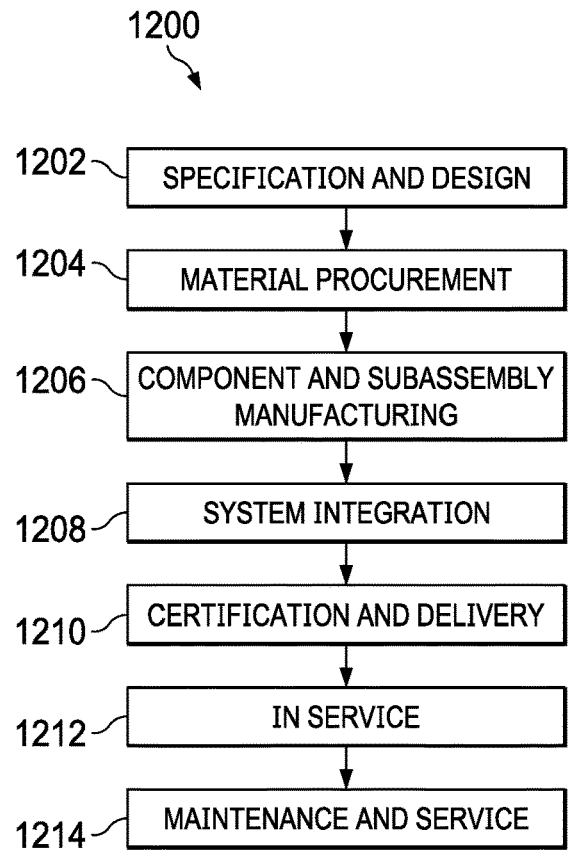
FIG. 12 is an illustration of an aircraft manufacturing and service method in a form of a block diagram in accordance with an illustrative embodiment.
Figure 13:
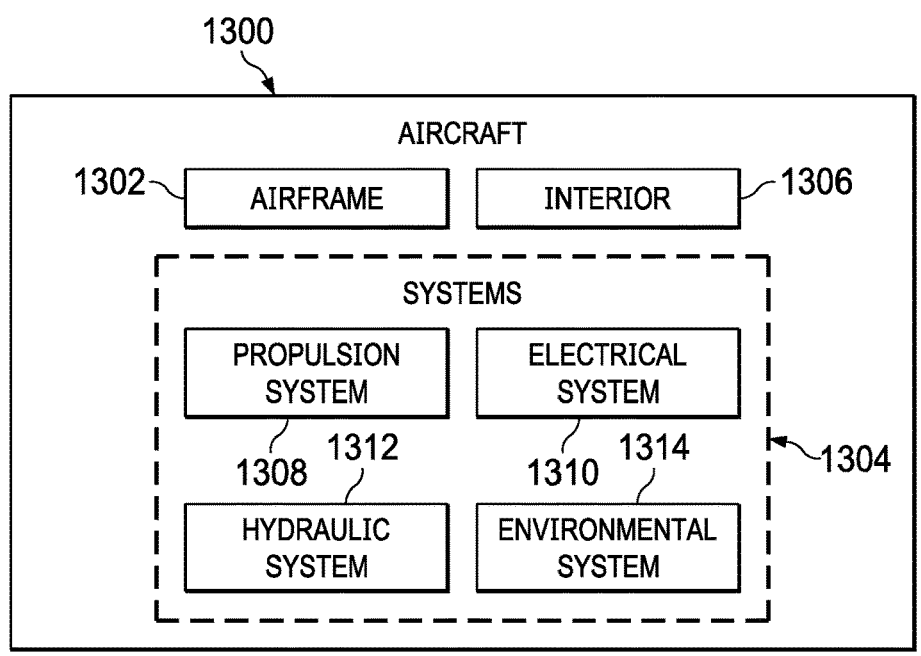
FIG. 13 is an illustration of an aircraft in a form of a block diagram in which an illustrative embodiment may be implemented.

Illustrative embodiments of the present disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for routine maintenance and service 1214, which may include modification, reconfiguration, refurbishment, or other maintenance and service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 is produced by aircraft manufacturing and service method 1200 of FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200. One or more illustrative embodiments may be used during at least one of component and subassembly manufacturing 1206, system integration 1208, or maintenance and service 1214 of FIG. 12. For example, layup support 112 may be used during component and subassembly manufacturing 1206 to form composite structure 104 of aircraft 1300. As another illustrative example, layup support 112 may be used to form a replacement component for use in maintenance and service 1214. Layup support 112 may be used to manufacture portions of aircraft 1300 such as airframe 1302 or portions of interior 1306.

The illustrative examples improve fabrication of integrally stiffened structures. The illustrative examples provide layup supports to support the layup of composite material. The layup supports provide support over cavities in a mold. The layup support comprises a thin, rigid cap to be placed over the cavity prior to lamination of the skin. The layup support creates a surface that will not comply under the pressure of a fiber placement roller. The layup supports optionally include geometric features that could replace traditional radius fillers.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a composite structure comprising:
placing a first composite material into a cavity of a mold;
placing a layup support over the first composite material and the cavity; and
laying up a second composite material comprising a number of composite plies over the layup support, the first composite material, and the cavity,
wherein the layup support comprises an at least partially cured composite material, a first edge having a first integrally formed filler and a second edge having a second integrally formed filler, wherein the first integrally formed filler fills a first radius formed by the first composite material and the second composite material and the second integrally formed filler fills a second radius formed by the first composite material and the second composite material.

2. The method of claim 1 further comprising:
curing the number of composite plies and the composite material while the layup support is present over the cavity.

3. The method of claim 2, wherein curing the number of composite plies and the composite material forms a stiffened composite skin with the layup support bonded to the number of composite plies.

4. The method of claim 2, wherein curing the number of composite plies and the composite material forms a stiffened composite skin, the method further comprising:
removing the layup support from the stiffened composite skin after curing the composite material.

5. The method of claim 1 further comprising:
placing a bladder into the cavity over the composite material, wherein the layup support is placed over the bladder.

6. The method of claim 1 further comprising:
placing a release film over the layup support prior to laying up the number of composite plies over the layup support.

7. The method of claim 1, wherein the layup support is formed of cured composite material, the first integrally formed filler forms a first radius filler and the second integrally formed filler forms a second radius filler.

8. A layup support configured to provide support for laying up composite material, the layup support comprising:
a first surface having a curvature configured to continue a curvature of a mold over a cavity in the mold; and
a second surface opposite the first surface, the second surface facing the cavity,
wherein the layup support comprises an at least partially cured composite material, a first edge having a first integrally formed filler and a second edge having a second integrally formed filler, wherein the first integrally formed filler fills a first radius formed by a first composite material and a second composite material and the second integrally formed filler fills a second radius formed by the first composite material and the second composite material.

9. The layup support of claim 8,
wherein the second edge is separated from the first edge by a width of the layup support.

10. The layup support of claim 8, wherein the layup support is formed of cured composite material, the first integrally formed filler forms a first radius filler and the second integrally formed filler forms a second radius filler.

11. The layup support of claim 10, wherein the radius filler has a first cross-section shape to connect between a composite stiffener and a composite skin and the second radius filler has a second cross-section shape to connect between the composite stiffener and the composite skin.

12. The layup support of claim 8, wherein a thickness of the layup support is formed by two to four composite plies.

13. A composite layup system comprising:
a mold having a curvature and a cavity;
a first composite material on the mold;
a second composite material on the first composite material; and
a layup support configured to provide support for laying up the second composite material on both the first composite material and the mold, the layup support comprising an at least partially cured composite material, a first edge having a first integrally formed filler, a second edge having a second integrally formed filler, a first surface having a curvature configured to continue the curvature of the mold over the cavity and a second surface opposite the first surface, wherein the first integrally formed filler fills a first radius formed by the first composite material and the second composite material and the second integrally formed filler fills a second radius formed by the first composite material and the second composite material.

14. The composite layup system of claim 13 further comprising:
a bladder configured to be placed within the cavity.

15. The composite layup system of claim 13, wherein the curvature of the mold is convex.

16. The composite layup system of claim 13, wherein the first edge and the second edge are separated by a width of the layup support, wherein the width of the layup support is the same as a width of the cavity.

17. The composite layup system of claim 13, wherein the layup support further comprises a number of filler portions associated with the first edge and the second edge.

18. The composite layup system of claim 13, wherein a length of the layup support is the same as a length of the cavity.

19. The composite layup system of claim 13, wherein the layup support is formed of cured composite material, the first integrally formed filler forms a first radius filler and the second integrally formed filler forms a second radius filler.

20. The composite layup system of claim 13, wherein the curvature of the mold is planar.

* * * * *